United States Patent [19]

Bonne et al.

[11] Patent Number: 5,237,523
[45] Date of Patent: Aug. 17, 1993

[54] FLOWMETER FLUID COMPOSITION AND TEMPERATURE CORRECTION

[75] Inventors: Ulrich Bonne, Minneapolis; David Kubisiak, Chanhassen, both of Minn.

[73] Assignee: Honeywell Inc., Minneapolis, Minn.

[21] Appl. No.: 558,034

[22] Filed: Jul. 25, 1990

[51] Int. Cl.⁵ .................. G01D 18/00; G01F 1/86; G01F 1/68

[52] U.S. Cl. ............... 364/571.03; 364/571.01; 364/510; 73/861.02; 73/204.18; 374/40; 374/44

[58] Field of Search ............ 364/571.01–571.05, 364/571.07, 510, 556, 564, 863; 73/861.01–861.03, 204.18, 204.19; 374/1, 29, 40, 43, 44

[56] References Cited

U.S. PATENT DOCUMENTS

| | | | |
|---|---|---|---|
| 3,905,229 | 9/1975 | Togo et al. | 364/571.03 X |
| 4,475,388 | 10/1984 | Kawai et al. | 73/204.18 |
| 4,621,929 | 11/1986 | Phillips | 374/43 |
| 4,663,977 | 5/1987 | Vander Heyden | 364/510 X |
| 4,720,800 | 1/1988 | Suzuki et al. | 364/510 |
| 4,807,151 | 2/1989 | Citron | 364/571.03 X |
| 4,885,938 | 12/1989 | Higashi | 73/861.02 X |
| 4,944,035 | 7/1990 | Aagardl et al. | 364/556 |
| 4,956,793 | 9/1990 | Bonne et al. | 374/43 X |
| 4,961,348 | 10/1990 | Bonne | 73/861.02 |

Primary Examiner—Parshotam S. Lall
Assistant Examiner—Edward Pipala
Attorney, Agent, or Firm—Michael B. Atlass; Gregory A. Bruns

[57] ABSTRACT

A method for correcting the flow measurement of a gaseous or liquid fluid of interest for changes in the composition and temperature of that fluid in a flowmeter of the hot element type is disclosed in which an uncorrected flow value signal for the fluid of interest in relation to a hot element sensor output is corrected by applying a first correction factor to the output based on certain unique physical parameters of the fluid of interest which nominally include thermal conductivity, k, specific heat, $c_p$, and temperature, T, obtaining an uncorrected flow measurement value from the corrected output and obtaining the corrected flow measurement by applying a second correction factor to the uncorrected flow measurement value based on the certain unique physical parameters.

20 Claims, 7 Drawing Sheets

FLOWMETER FLUID COMPOSITION AND TEMPERATURE CORRECTION

CROSS REFERENCE TO RELATED APPLICATION

Reference is made to copending allowed application Ser. No. 07/285,897 filed Dec. 16, 1988, now U.S. Pat. No. 4,961,348 issued Oct. 9, 1990 and assigned to the common assignee of the present application.

BACKGROUND OF THE INVENTION

The present invention relates to fluid flow measurement and, more particularly, addresses overcoming inaccuracies in flow measurement. The invention provides a method for eliminating errors in mass and volumetric (and energy) flow rates measured for primarily gaseous fluid with respect to temperature changes in the gaseous fluids.

Flow sensors that utilize a pair of thin film heat sensors and a thin film heater are known. An example of such a device is illustrated and described in U.S. Pat. No. 4,501,144 to Higashi, et al. The thin film heat sensors may be arranged in a Wheatstone bridge so that the output of the bridge is representative of flow. These microanemometers or "microbridges" are produced using similar techniques to those used for producing integrated circuits and are thus quite inexpensive.

As will be described in greater detail herein, such microanemometers or microbridges are capable of quite accurate flow sensing when directly exposed to a stream of fluid flowing past them. In this manner, such a sensor can be used to directly measure the flow velocity of the fluid.

While such a sensing system can be used to approximately measure mass flow, a significant level of error has been experienced with respect to changes in composition of the measured fluid in prior devices using this system. The above referred to U.S. Pat. No. 4,961,348 describes in detail a method of correcting gaseous fluid flow measurement for changes in composition. Applying the composition corrections provided in U.S. Pat. No. 4,961,348 will generally provide flow measurements accurate to within 10%. While this accuracy is sufficient for many nonprecision applications, there remain many precision applications that require a greater accuracy. Further investigation has resulted in the discovery of the algorithm of the present invention. The investigation showed that after applying the composition correction, there still remained an error due to the temperature difference of the gaseous fluid relative to the temperature of the calibration fluid.

For illustration purposes, errors due to temperature of about 0.2% per °C. were observed when the temperature of the gaseous fluid varied about ±10° from the 23° C. calibration temperature. This error of approximately 5% for a 10° temperature difference is unacceptable for many precision gas flow measurement applications. Thus a need exists for a method to correct gas flow measurements for variations in the temperature of the flowing gas from the temperature of the calibration gas.

SUMMARY OF THE INVENTION

The present invention solves these needs and problems in the field of hot element (wire or film) gas flow measurements by providing a method which can be used to correct the measured flow for changes in both the composition of the gas and the temperature of the gas relative to the calibration gas composition and temperature.

The invention includes an equation for determining a gauge correction ($C_G$) which is applied to a measured gauge output (G) of the microbridge (MB) and an equation for determining a volumetric flow correction ($C_V$) which is applied to the measured volumetric flow (V).

$$V = V(G) \tag{1}$$

The $C_G$ and $C_V$ corrections are determined using preferred equations of the form:

$$C_G = (k_e/k_{co})^{n_1} (c_{pe}/c_{pco})^{n_2} (T_e/T_c)^{n_3} \tag{2}$$

$$C_V = (k_e/k_{co})^{n_4} (c_{pe}/c_{pco})^{n_5} (T_e/T_c)^{n_6} \tag{3}$$

where:
- $K_e$ = thermal conductivity of the measured gas at the environment or calibration temperature and pressure
- $k_{co}$ = thermal conductivity of the calibration gas at the calibration temperature and pressure
- $c_{pe}$ = specific heat of the measured gas at the environment or calibration temperature and pressure
- $c_{pco}$ = specific heat of the calibration gas at the calibration temperature and pressure
- $T_e$ = absolute temperature of the measured gas environment
- $T_c$ = absolute temperature of the calibration gas
- $n_1$ through $n_6$ = constants determined during a calibration process While the influence of pressure on k and $c_p$ is minor under most conditions, applications using high pressures i.e. over 100 psia (or over 7 atm) would experience said influences, and would require the full power of eqs. (2) and (3).

After constants $n_1$ through $n_6$ have been determined in the calibration procedure, the equation for $C_G$ and $C_V$ may be used to determine the appropriate $C_G$ and $C_V$ for a gas flow measurement when the gas has a thermal conductivity $k_e$, a specific heat $c_{pe}$ and a temperature $T_e$.

The use of the $C_G$ and $C_V$ correction is explained as follows. A measured volumetric flow, V, is determined according to:

$$V = f(G_C) \tag{1}$$

where
- G = microbridge output or gauge signal and
- $G_C = G/C_G$
- $f(G_C)$ = polynomial function of $G_C$ The measured volumetric flow is then corrected to a corrected volumetric flow ($V_C$) according to:

$$V_C = V/C_V$$

The present invention includes the steps of a calibration process and of a user process. The calibration process begins by experimentally determining microbridge output values for known volumetric flows for several gases at several temperatures. Such data may be represented graphically as calibration curves, $V = f(G)$.

Each calibration curve is then compared to one specially selected or reference calibration curve. Correction factors $C_G$ for the microbridge gauge output signal and correction factors $C_V$ for the volumetric flows are experimentally determined in such a way as to achieve a best match between the reference calibration curve and all other curves.

Values of thermal conductivity, specific heat and temperature for each of the gases at each of the temperatures are either theoretically determined from known thermodynamic data or measured. These values are normalized with respect to the reference condition.

To complete the calibration process, the algorithm of the present invention is then derived to relate the experimentally determined correction factors $C_G$ and $C_V$ to the normalized values of k, $c_p$ and T. An algorithm is then available to a user for use to correct a gas flow measurement for composition and temperature changes.

In the typical user process a gas flow measurement is being made. A measured microbridge output signal, G, is obtained. Using the thermal conductivity, specific heat and temperature also obtained with the microbridge during the gas flow measurement and the formula of the invention a gauge correction factor $C_G$ is determined. A corrected gauge output value, $G_C$, is determined by dividing the measured gauge output, G by the correction factor $C_G$.

The corrected gauge output, $G_C$, is then used in an equation that calculates measured gas flow, V. This equation is of the form:

$$V = a_0 + a_1 G^{m_1} + a_2 G^{m_2} + a_3 G^{m_3} \ldots = V(G) \quad (1)$$

where $m_i$ and $a_i$ = constants which represent the reference calibration curve After the measured volumetric flow, V, is determined, it must be corrected by a correction factor, $C_V$.

$C_V$ is determined by using the algorithm of the invention. The corrected volumetric flow, $V_C$, is then determined by dividing V by $C_V$.

DESCRIPTION OF THE INVENTION

Figure 1:
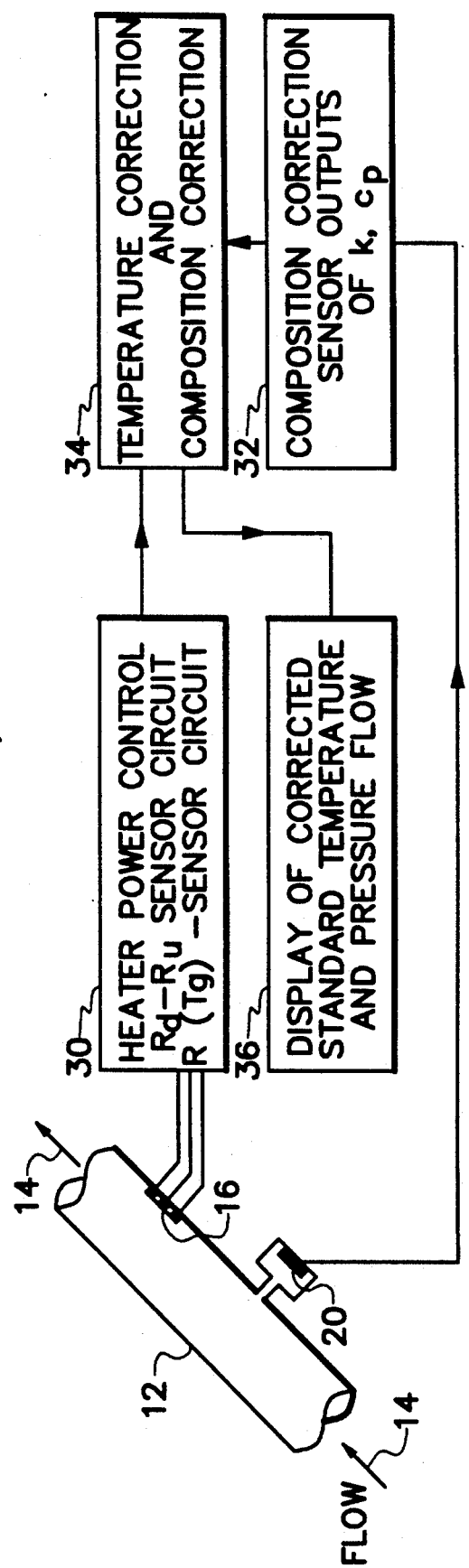
FIG. 1 is a diagrammatic representation of a method of composition and temperature compensation of gas flow measurements in accordance with the present invention.

FIG. 1 illustrates one embodiment of applicant's invention of a method of temperature compensation for microbridge flow sensors. The system is depicted as a section of pipe, gas pipe, conduit or the like 12 through which a gaseous fluid 14 of interest is flowing.

A microbridge or microanemometer sensor package for sensing flow through the system is shown generally at dynamic flow location 16. It includes an individual microbridge sensor for dynamic sensing of fluid flow. Semiconductor chip sensors or microbridges of the class described are treated in a more detailed manner in one or more of patents such as U.S. Pat. Nos. 4,478,076, 4,478,077, 4,501,144, 4,555,939, 4,651,564 and 4,683,159 all of common assignee with the present invention. To the extent necessary, additional details with respect to the microbridge sensors are incorporated by reference from these cited documents.

Microbridge sensors typically require heated power control circuitry as identified in block 30. In addition, circuitry is needed for monitoring the difference in resistance of a resistor ($R_d$) located downstream of the heated elements and a resistor ($R_u$) located upstream of the heated elements as identified in block 30.

In accordance with the present invention, a resistive temperature sensing element R is required for the purpose of measuring the temperature $T_g$ of the gas. Resistor R, is indicated in FIG. 1 as being located at the dynamic flow location 16. Resistor R is a resistor element which may be located on the microbridge chip.

In accordance with U.S. Pat. No. 4,961,348, a second microbridge location called a static microbridge location is indicated at 20. The method of determining the composition correction based on thermal conductivity, k, and specific heat, $c_p$, identified in block 32 of FIG. 1 is disclosed in the U.S. Pat. No. 4,961,348. An alternate location for resistor R is at static location 20.

FIG. 1 illustrates that information from block 32 on composition correction and information from block 30 including gas temperature information is provided to block 34. After calculations relating to flow and composition and temperature corrections, the flow at standard temperature and pressure is displayed as identified in block 36.

Figure 2:
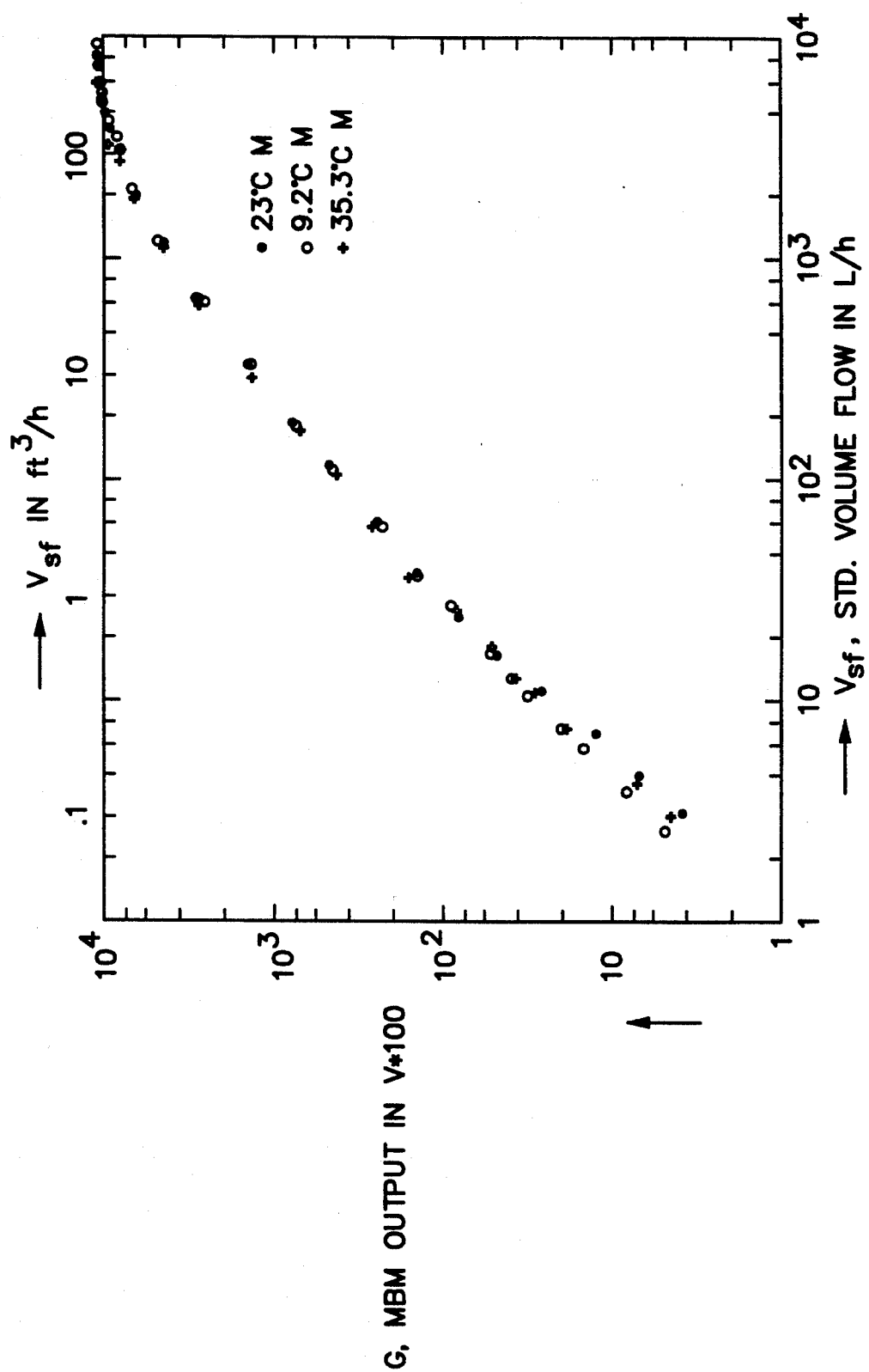
FIG. 2 is a plot of the microbridge output signals as a function of volumetric flows for gas flow measurements using methane at temperatures at 9.2° C., 23° C. and 35.3° C.

FIG. 2 is a plot of the measured microbridge output or gauge G versus the standard volume flow of methane at temperatures of 9.2° C., 23° C. and 35.3° C. Ideally, the plots for the three temperatures would be identical. Actually, the error due to temperature is so small that it is not readily apparent from FIG. 2. However, if only the error is plotted as in FIG. 3, it is apparent that the error of the 9.2° C. measurement and the 35.3° C. measurement relative to the 23° C. measurement are significantly greater than ±1%.

This invention teaches a method of correcting for the effects of temperature differences between the calibration gas at the time of the calibration and the test gas at the time of device use in the following overall compensation equation.

$$V_C = V(G/C_G) \times (1/C_V) \quad (1a)$$

Where

V = Volumetric flow rate as a function of G or $G/C_G$

G = the $R_d - R_u$ microbridge output or gauge signal
$C_G$ = correction of gauge output signal
$C_V$ = correction of measured volumetric flow Equation 1a corrects for temperature effect errors by causing a y-axis shift of the calibration curve with the $C_G$ correction factor and for temperature effects by causing an x-axis shift of the calibration curve with the $C_V$ correction factor.

A preferred complete temperature correction is of the following form:

$$C_G = (k_e/k_{co})^{n1}(c_{pe}/c_{pco})^{n2}(T_e/T_c)^{n3} \quad (2)$$

$$C_V = (k_e/k_{co})^{n4}(c_{pe}/c_{pco})^{n5}(T_e/T_c)^{n6} \quad (3)$$

where
- $n_1$ through $n_6$ = constants determined by the calibration procedure
- subscript e = during experiment or test
- subscript c = during calibration
- subscript o = for calibration gas (generally air or methane)
- k = thermal conductivity as measured by the composition correction MB
- $c_p$ = either specific heat in pressure independent units of, e.g. cal/(mol C) or its temperature derivative, also pressure independent
- T = absolute temperature It will be understood that other more general equations may be used to recognize the physics of the microbridge sensor structure. Particularly the thermal conductivity and specific heat of not only the gas, but also of solid substances of the sensor may be considered. Other more general forms of equation 2 are shown below:

$$1/C_G = \{(A_0 + k_e)/(A_0 + k_{co})\}^{n1}\{(B_0 + c_{pe})/(B_0 + c_{pco})\}^{n2}\{T_e/T_c\}^{n3} \quad (2a)$$

$$1/C_G = \{(A_0 + A_1 k_e^{m1} + A_2 k_e^{m2} + \ldots)/(A_0 + A_1 k_{co}^{m1} + A_2 k_{co}^{m2} + \ldots)\}^{n1}$$
$$\{(B_0 + B_1 c_{pe}^{p1} + B_2 c_{pe}^{p2} + \ldots)/(B_0 + B_1 c_{pco}^{p1} + \ldots)\}^{n2}\{T_e/T_c\}^{n3} \quad (2b)$$

where constants $A_i$, $B_i$ and $m_i$ are determined during the calibration procedure and allow for recognition of the thermal conductivity and specific heat of substances other than the gas. More general forms of equation 3 are shown below:

$$1/C_V = \{(C_0 + k_e)/(C_0 + k_{co})\}^{n4}\{(D_0 + c_{pe})/(D_0 + c_{pco})\}^{n5}\{T_e/T_c\}^{n6} \quad (3a)$$

$$1/C_V = \{(C_0 + C_1 k_e^{q1} + C_2 k_e^{q2} + \ldots)/(C_0 + C_1 k_{co}^{q1} + C_2 k_{co}^{q2} + \ldots)\}^{n4}$$
$$\{(D_0 + D_1 c_{pe}^{r1} + \ldots)/(D_0 + D_1 c_{pco}^{r1} + \ldots)\}^{n5}\{T_e/T_c\}^{n6} \quad (3b)$$

where constants $C_i$, $D_i$, $q_i$ and $r_i$ are determined during the calibration process and allow for recognition of the thermal conductivity and specific heat of substances other than the gas, and other heat transfer processes such as radiative ones.

The implementation of the correction provided by the present invention will now be explained.

For illustration purposes we will use methane, ethane and nitrogen as the gases of interest and microbridge calibration data at approximately 5° C., 23° C. and 35° C. It is understood that those are merely examples and the invention applies to other gases and calibration data at other temperatures.

It is further understood that while this invention is described with respect to volumetric gas flow measurements, it is also applicable to mass flow measurements or energy flow measurements. For mass flow measurements, the uncorrected mass flow is designated M and the corrected mass flow is designated $M_C$. For energy flow measurements, the uncorrected energy flow is designated E and the corrected energy flow is designated $E_C$. For mass flow and energy flow measurements, the gauge correction ($C_G$) remains the same, but the mass correction is designated as $C_M$ and the energy correction is designated as $C_E$.

CALIBRATION PROCESS

This process includes the following steps:

1) Determination of microbridge calibration curves for several gases of interest at several temperatures. Equations (2) and (3) for $C_G$ and $C_V$, respectively, require for each the determination of 3 unknown exponents. Therefore, at least 3 calibration curves must be determined. The microbridge calibration curve is a plot of microbridge output values versus standard volume flows.

2) Selection of one gas, e.g. methane at 23° C. as the reference operating condition and fitting the best possible calibration curve to the microbridge output values. This establishes a reference calibration curve for methane at 23° C., V(G).

3) Determining the correction factors $C_G$ and $C_V$ for other temperatures of methane and for other gases at other temperatures. This is accomplished by comparing the other calibration curves to the reference calibration curve and determining the gauge correction factors $C_G$ needed to cause the necessary y-axis shifts and the volumetric correction factors $C_V$ needed to cause the necessary x-axis shifts to allow the other calibration curves to conform to the chosen reference curve, i.e. the methane calibration curve at 23° C. The determination ma be by visual comparison of the calibration curves or by using known data processing techniques.

4) Calculation from thermodynamic reference data or from measured data the values of $k/k_o$, $c_p/c_{po}$ and $T/T_o$ for the other gases and other temperatures.

5) Use the $C_G$ and $C_V$ values experimentally determined for other gases and temperatures and the normalized k, $c_p$ and T values calculated, and solve for the best $n_1$ through $n_6$ in equations (2) and (3).

Equations (2) and (3) can then be used with the determined $n_1$ through $n_6$ to determine $C_G$ and $C_V$ for any gas at any temperature.

Table 1 shows selected representative values obtained for methane, ethane and nitrogen when the described calibration process was used.

Figure 3:
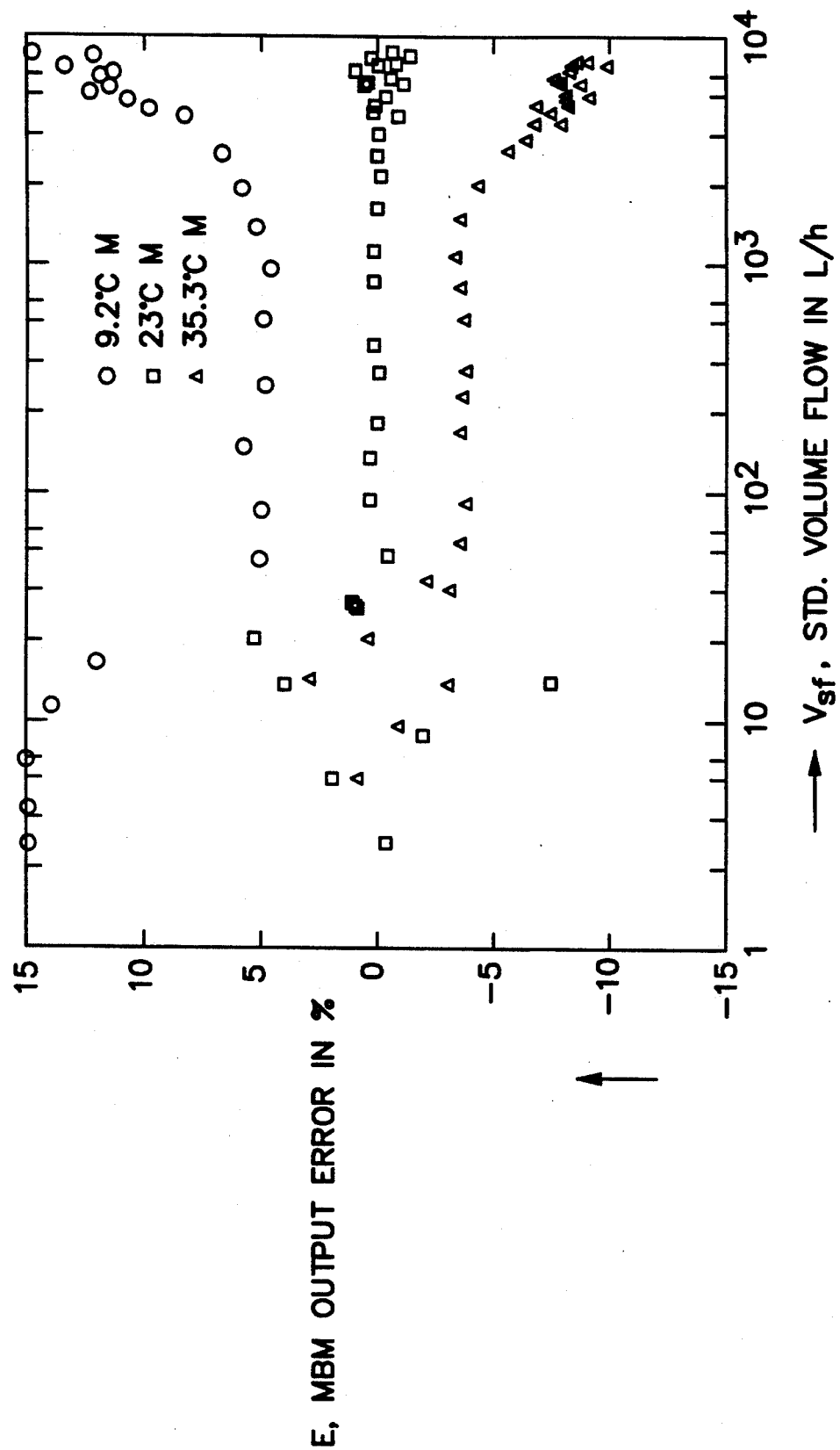
FIG. 3 is a plot of the error in percent of a microbridge flow measurement versus volumetric flow when the correction factors of the present invention are not used. The gas is methane at temperatures of 9.2° C., 23° C. and 35.3° C.
Figure 4:
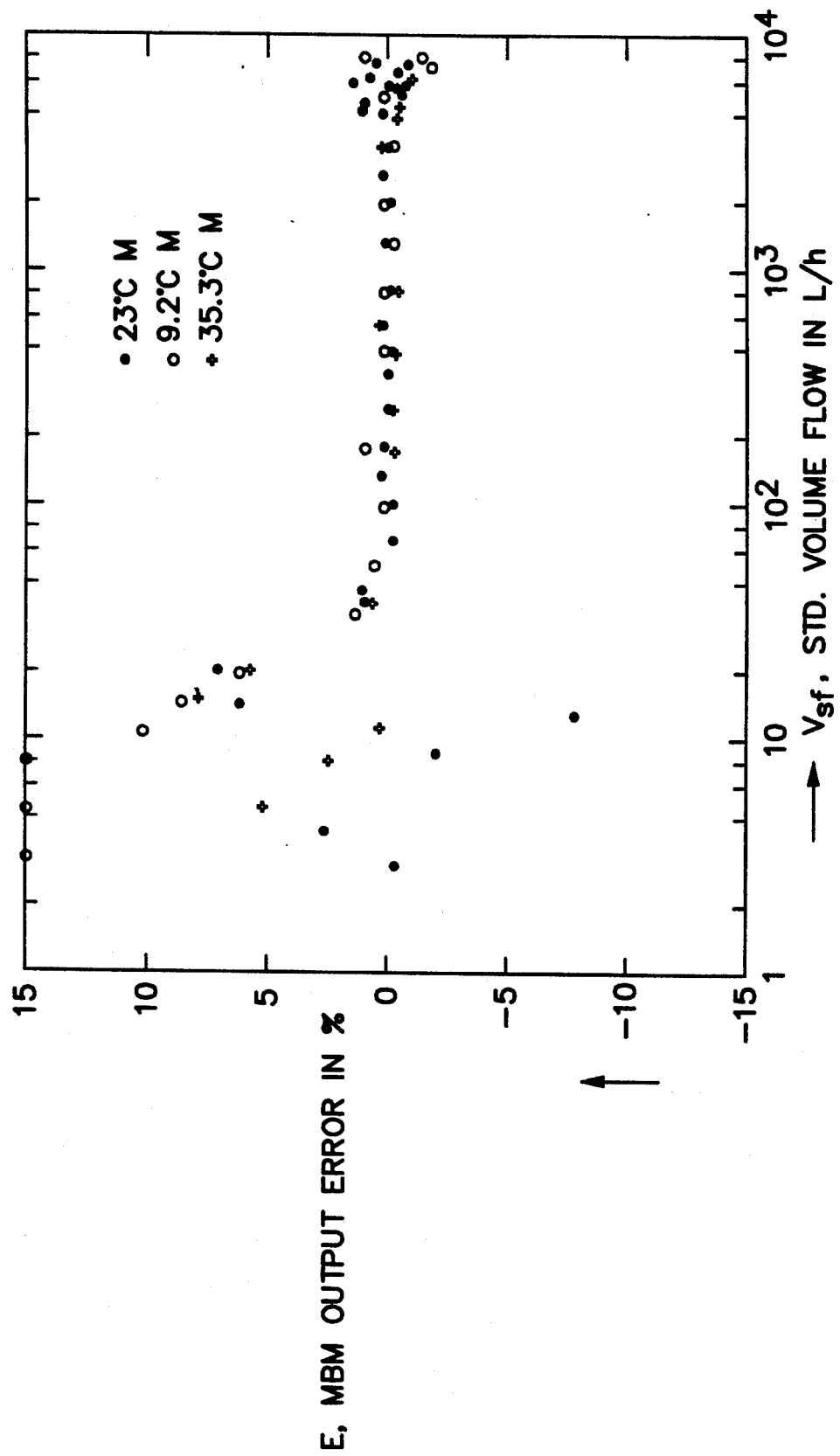
FIG. 4 is a plot of the microbridge flow measurement error as a function of volumetric flow after the corrections of the present invention have been applied. The gas is methane at temperatures of 9.2° C., 23° C. and 35.3° C.

FIG. 4 illustrates the results of applying the temperature correction of the present invention to methane flow measurements at gas temperatures of 9.2° C., 23° C. and 35.3° C. A very significant improvement over FIG. 3 is noted with the error at flow above 30 liters per hour L/h being within about ±1%.

Figure 5:
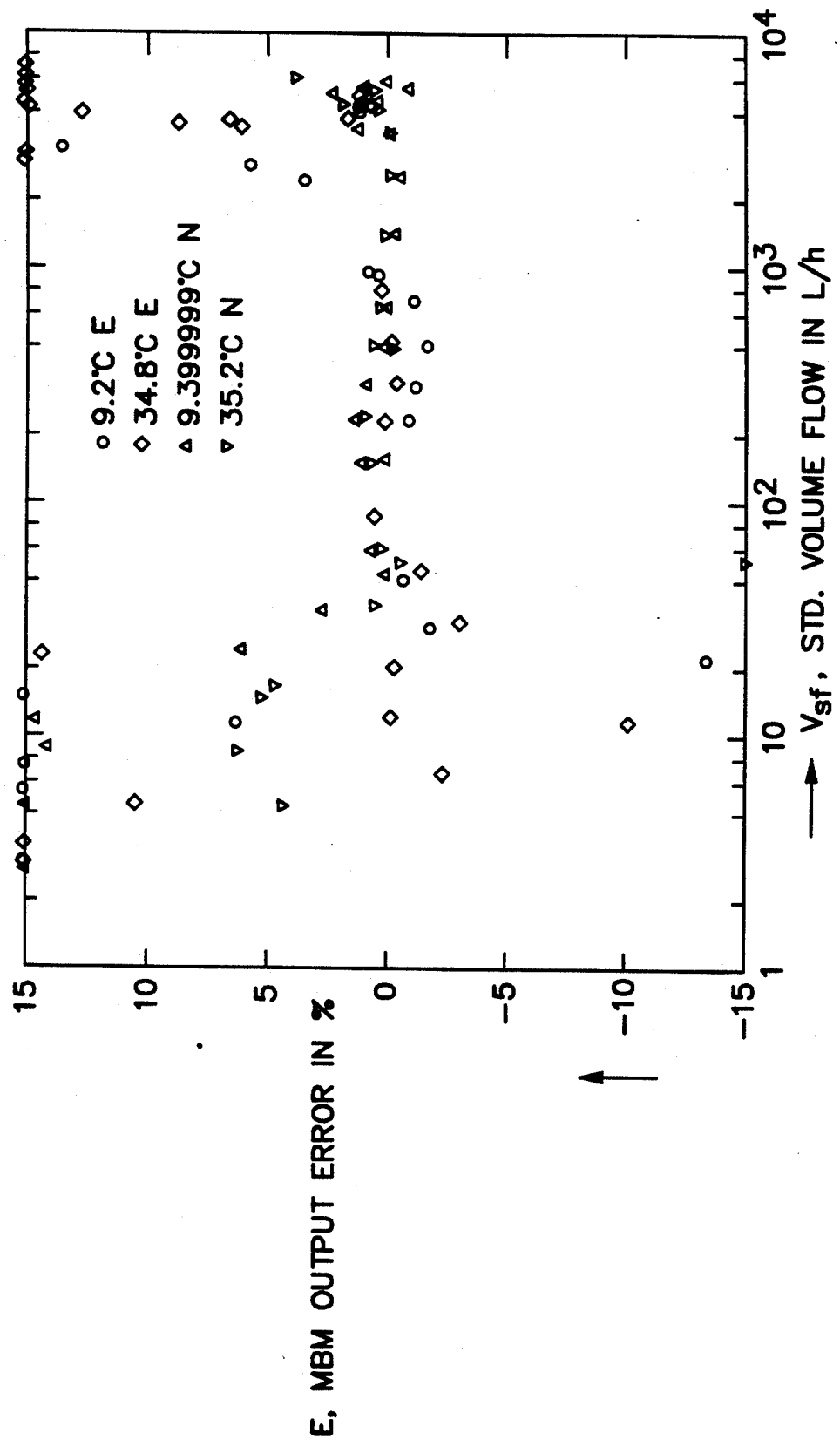
FIG. 5 is a plot of the microbridge flow measurement error in percent as a function of volumetric flow with the corrections of the present invention applied. The gases are ethane at 9.2° C. and 34.8° C., and nitrogen at 9.4° C. and 35.2° C.
Figure 6:
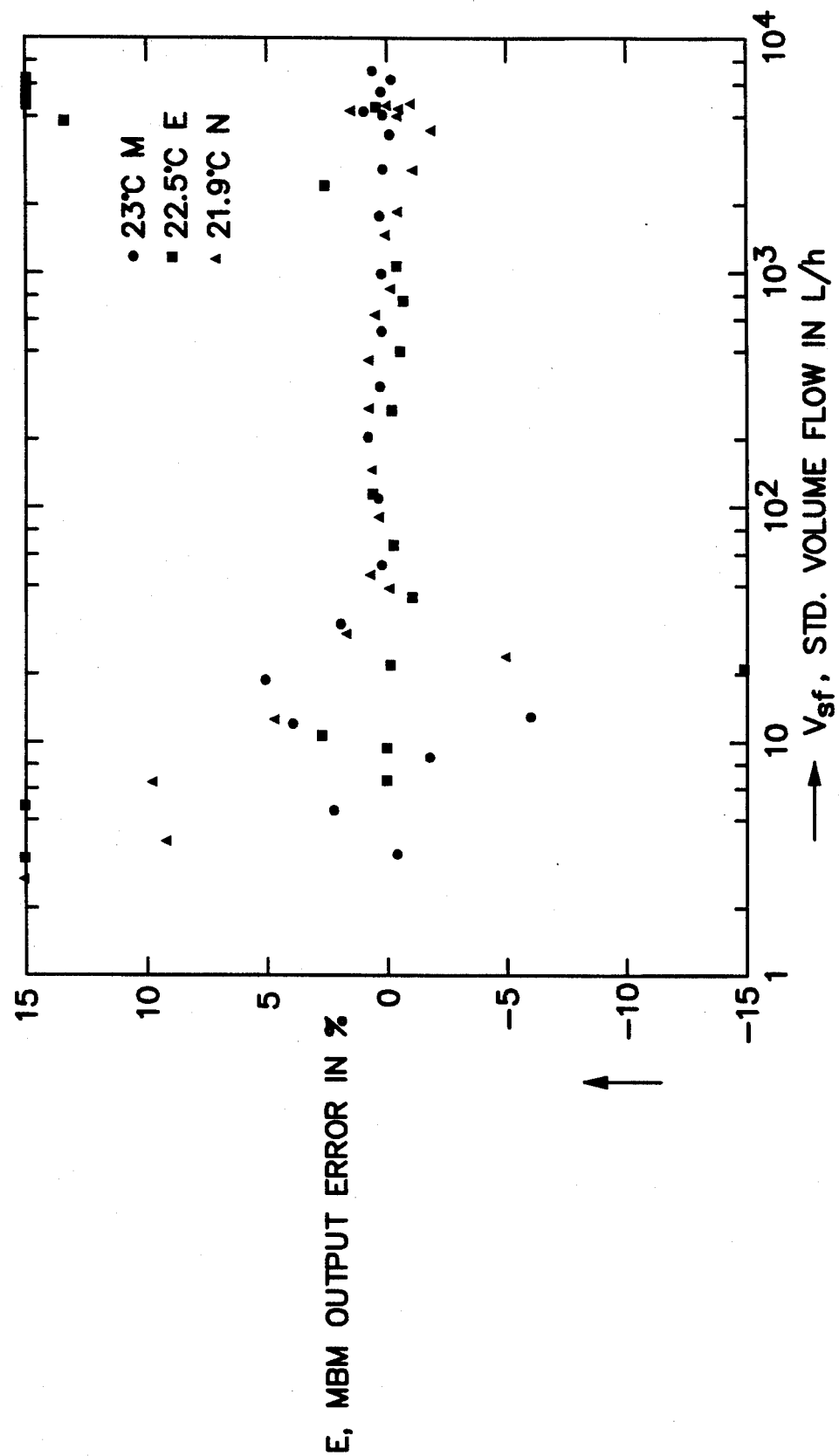
FIG. 6 is a plot of the microbridge flow measurement error only in percent as a function of volumetric flow for methane at 23° C., ethane at 22.5° C. and nitrogen at 21.9° C.

FIG. 5 illustrates the applicability of applicant's invention to gases significantly different than methane such as ethane and nitrogen.

Applicant has disclosed a method for correcting for the composition and temperature of a gas in order to achieve a corrected volumetric gas flow measurement.

It will be apparent to those skilled in the art that this same methodology used to achieve volumetric flow corrections may be used to achieve mass flow corrections; values of $n_4$, $n_5$ and $n_6$ were found to need adjustment, while $n_1-n_3$ required none.

Figure 7:
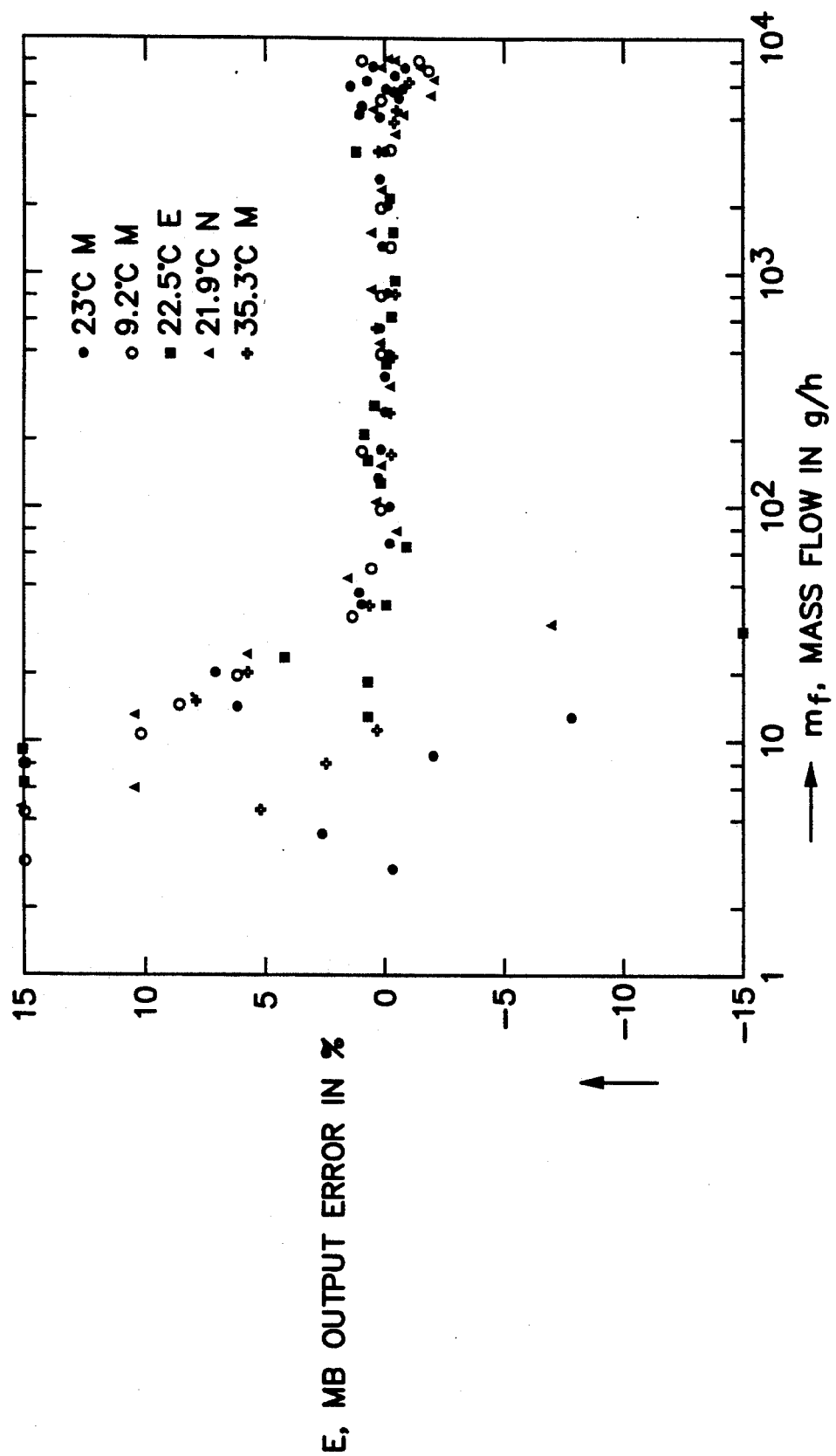
FIG. 7 is a plot of the microbridge flow measurement error in percent as a function of the mass flow for methane at 9.2° C., 23° C. and 35.3°, ethane at 22,5° C. and nitrogen at 21.9° C.

FIG. 7 illustrates the application of applicant's invention to mass flow measurements of methane, ethane and nitrogen. It will be noted that at flow rates above 100 g/h the error is generally less than ±1%.

It will further be appreciated to those skilled in the art that the same methodology used to achieve volumetric flow corrections may be used to achieve energy flow corrections for certain groups of like combustible fluids.

In accordance with the foregoing description, applicant has developed a gas composition and gas temperature correction method that will provide very accurate gas flow measurements. Applicant's invention is applicable to volumetric flow measurements, mass flow measurements or energy flow measurements. Applicant's invention was accomplished by the recognition and solution of a long standing problem in gas flow measurements. Applicant's invention may readily be incorporated into those gas flow measurement applications requiring precision measurement.

TABLE 1

| GAS | TEMPERATURE °C. | |
|---|---|---|
| CH₄ (Methane) | 23° | $C_G = 1$ |
| | | $C_V = 1$ |
| CH₄ | 9.2° | $C_G = 0.9847$ |
| | | $C_V = 1.0299$ |
| CH₄ | 35.3° | $C_G = 1.0132$ |
| | | $C_V = 0.9753$ |
| C₂H₄ (Ethane) | 22.5° | $C_G = 0.9819$ |
| | | $C_V = 2.1588$ |
| C₂H₄ | 9.2° | $C_G = 0.9686$ |
| | | $C_V = 2.2394$ |
| C₂H₄ | 34.8° | $C_G = 0.9939$ |
| | | $C_V = 2.0918$ |
| N₂ (Nitrogen) | 22.9° | $C_G = 1.0169$ |
| | | $C_V = 1.0321$ |
| N₂ | 9.4° | $C_G = 1.0017$ |
| | | $C_V = 1.0601$ |
| N₂ | 35.2° | $C_G = 1.0327$ |
| | | $C_V = 1.0046$ |

| $n_1$ | $n_2$ | $n_3$ |
|---|---|---|
| −0.015331 | −0.060124 | 0.387617 |
| $n_4$ | $n_5$ | $n_6$ |
| −0.85033 | 0.9845898 | 0.027236 |

What is claimed is:

1. A method of obtaining a signal indicative of fluid flow rate ($V_C$) which is corrected for variations in specific heat ($C_{pe}$), thermal conductivity ($K_e$) and temperature ($T_e$) utilizing an output (G) of a first dynamic microbridge exposed to the fluid, comprising the steps of:

(A) measuring $C_{pe}$, $K_e$ and $T_e$ using the G output of said first dynamic microbridge;

(B) calculating a gauge correction value ($C_G$) as a first function of $C_{pe}$, $K_e$ and $T_e$;

(C) calculating a flow correction value ($C_V$) as a second function of $C_{pe}$, $K_e$ and $T_e$;

(D) producing a corrected gauge output ($G_C$) as a function of G and $C_G$;

(E) calculating an uncorrected flow value (V) as a function of $G_C$; and (F) producing a corrected fluid flow output signal ($V_C$) as a function of (V) and $C_V$.

2. The method of claim 1 wherein the gauge correction factor is determined according to a relationship selected from:

$$C_G = (k_e/k_{co})^{n1}(c_{pe}/c_{pco})^{n2}(T_e/T_c)^{n3}$$

or $$1/C_G = \{(A_0 + k_e)/(A_0 + k_{co})\}^{n1}\{(B_0 + c_{pe})/(B_0 + c_{pco})\}^{n2}\{T_e/T_c\}^{n3}$$

or $$1/C_G = \{(A_0 + A_1k_e^{m1} + A_2k_e^{m2} + \ldots)/(A_0 + A_1k_{co}^{m1} + A_2k_{co}^{m2} + \ldots)\}^{n1}$$
$$\{(B_0 + B_1c_{pe}^{p1} + B_2c_{pe}^{p2} + \ldots)/(B_0 + B_1c_{pco}^{p1} + \ldots)\}^{n2}\{T_e/T_c\}^{n3}$$

and the volumetric correction factor ($C_V$) is determined according to a relationship selected from:

$$C_V = (k_e/k_{co})^{n4}(c_{pe}/c_{pco})^{n5}(T_e/T_c)^{n6}$$

or $$1/C_V = \{(C_0 + k_e)/(C_0 + k_{co})\}^{n4}\{(D_0 + c_{pe})/(D_0 + c_{pco})\}^{n5}\{T_e/T_c\}^{n6}$$

or $$1/C_V = \{(C_0 + C_1k_e^{q1} + C_2k_e^{q2} + \ldots)/(C_0 + C_1k_{co}^{q1} + C_2k_{co}^{q2} + \ldots)\}^{n4}$$
$$\{(D_0 + D_1c_{pe}^{r1} + \ldots)/(D_0 + D_1c_{pco}^{r1} + \ldots)\}^{n5}\{T_e/T_c\}^{n6}$$

Where:
$n_1$ through $n_6$, $A_i$, $B_i$, $m_i$, $C_i$, $D_i$, $q_i$ and $r_i$ = constants determined by the calibration process, and $k_{co}$, $c_{pco}$ and $T_c$ = thermal conductivity, specific heat and temperature of the calibration gas.

3. The method of claim 1 wherein $c_{pe}$, $k_e$ and $T_e$ are determined by a second microbridge in relatively static communication with said fluid of interest.

4. The method of claim 2 wherein $c_{pe}$, $k_e$ and $T_e$ are determined by a second microbridge in relatively static communication with said fluid of interest.

5. The method of claim 2 wherein the gauge correction factor is determined according to the relationship:

$$C_G = (k_e/k_{co})^{n1}(c_{pe}/c_{pco})^{n2}(T_e/T_c)^{n3}$$

and the volumetric correction factor $C_V$ is determined according to the relationship:

$$C_V = (k_e/k_{co})^{n4}(c_{pe}/c_{pco})^{n5}(T_e/T_c)^{n6}$$

and $n_1$ through $n_6$, respectively, are approximately equal to: $-0.015331$
$-0.060124$
$0.387617$
$-0.85033$
$0.9845898$
$0.027236$ 6. The method of claim 3 wherein the gauge correction factor is determined according to the relationship:

$$C_G = (k_e/k_{co})^{n1}(c_{pe}/c_{pco})^{n2}(T_e/T_c)^{n3}$$

and the volumetric correction factor $C_V$, is determined according to the relationship:

$$C_V = (k_e/k_{co})^{n4}(c_{pe}/c_{pco})^{n5}(T_e/T_c)^{n6}$$

and $n_1$ through $n_6$, respectively, are approximately equal to:
$-0.015331$
$-0.060124$
$0.387617$
$-0.85033$
$0.9845898$
$0.027236$ 7. The method of claim 2 wherein said $C_G$ determined in step (C) is determined according to a known relationship among variables selected from the group consisting of specific heat ($c_{pe}$), the differential of specific heat with respect to temperature ($dc_{pe}/dT$), thermal conductivity ($k_e$), the differential of thermal conductivity with respect to temperature ($dK_e/dT$), density, viscosity, speed of sound, optical absorption or diffusibility.

8. The method of claim 2 wherein said step (C) of determining $C_G$ is omitted and $C_G$ is set equal to unity.

9. A method of obtaining a signal indicative of the mass fluid flow rate ($M_C$) which is corrected for variations in specific heat ($C_{pe}$), thermal conductivity ($K_e$) and temperature ($T_e$) utilizing an output (G) of a first dynamic microbridge exposed to the fluid, comprising the steps of:
 (A) measuring $C_{pe}$, $K_e$ and $T_e$ using said G output of said first dynamic microbridge;
 (B) calculating a gauge correction value ($C_G$) as a first function of $C_{pe}$, $K_e$ and $T_e$;
 (C) calculating a mass flow correction value ($C_M$) as a second function of $C_{pe}$, $K_e$ and $T_e$;
 (D) producing a corrected gauge output ($G_C$) as a function of G and $C_G$;
 (E) calculating an uncorrected mass flow value (M) as a function of $G_C$;
 (F) producing a corrected mass flow output signal ($M_C$) as a function of (M) and $C_M$.

10. The method of claim 9 wherein the gauge correction factor is determined according to a relationship selected from:

$$C_G = (k_e/k_{co})^{n1}(c_{pe}/c_{pco})^{n2}(T_e/T_c)^{n3}$$

or $$1/C_G = \{(A_0 + k_e)/(A_0 + k_{co})\}^{n1}\{(B_0 + c_{pe})/(B_0 + c_{pco})\}^{n2}\{T_e/T_c\}^{n3}$$

or $$1/C_G = \{(A_0 + A_1 k_e^{m1} + A_2 k_e^{m2} + \ldots)/(A_0 + A_1 k_{co}^{m1} + A_2 k_{co}^{m2} + \ldots)\}^{n1}$$
$$\{(B_0 + B_1 c_{pe}^{p1} + B_2 c_{pe}^{p2} + \ldots)/(B_0 + B_1 c_{pco}^{p1} + \ldots)\}^{n2}\{T_e/T_c\}^{n3}$$

and the mass correction factor ($C_M$) is determined according to a relationship selected from:

$$C_M = (k_e/k_{co})^{n4}(c_{pe}/c_{pco})^{n5}(T_e/T_c)^{n6}$$

or $$1/C_M = \{(C_0 + k_e)/(C_0 + k_{co})\}^{n4}\{(D_0 + c_{pe})/(D_0 + c_{pco})\}^{n5}\{T_e/T_c\}^{n6}$$

or $$1/C_M = \{(C_0 + C_1 k_e^{q1} + C_2 k_e^{q2} + \ldots)/(C_0 + C_1 k_{co}^{q1} + C_2 k_{co}^{q2} + \ldots)\}^{n4}$$
$$\{(D_0 + D_1 c_{pe}^{r1} + \ldots)/(D_0 + D_1 c_{pco}^{r1} + \ldots)\}^{n5}\{T_e/T_c\}^{n6}$$

Where:
 $n_1$ through $n_6$, $A_i$, $B_i$, $m_i$, $C_i$, $D_i$, $q_i$ and $r_i$ = constants determined by the calibration process, and
 $k_{co}$, $c_{pco}$ and $T_c$ = thermal conductivity, specific heat and temperature of the calibration gas.

11. The method of claim 9 wherein $c_{pe}$, $k_e$ and $T_e$ are determined by a second microbridge in relatively static communication with said fluid of interest.

12. The method of claim 10 wherein $c_{pe}$, $k_e$ and $T_e$ are determined by a second microbridge in relatively static communication with said fluid of interest.

13. The method of claim 10 wherein said $C_G$ determined in step (C) is determined according to a known relationship among variables selected from the group consisting of specific heat ($c_{pe}$), the differential of specific heat with respect to temperature ($dc_{pe}/dT$), thermal conductivity ($k_e$), the differential of thermal conductivity with respect to temperature ($dk_e/dT$), density, viscosity, speed of sound, optical absorption or diffusibility.

14. The method of claim 10 wherein said step (C) of determining $C_G$ is omitted and $C_G$ is set equal to unity.

15. A method of obtaining a signal indicative of the mass fluid flow rate ($E_C$) which is corrected for variations in specific heat ($C_{pe}$), thermal conductivity ($K_e$) and temperature ($T_e$) utilizing and output (G) of a first dynamic microbridge exposed to the fluid, comprising the steps of:
 (A) measuring $C_{pe}$, $K_e$ and $T_e$ using the G output of said first dynamic microbridge;
 (B) calculating a gauge correction value ($C_G$) as a first function of $C_{pe}$, $K_e$ and $T_e$;
 (C) calculating a energy flow correction value ($C_E$) as a second function of $C_{pe}$, $K_e$ and $T_e$;
 (D) producing a corrected gauge output ($G_C$) as a function of G and $C_G$;
 (E) calculating an uncorrected energy flow value (E) as a function of $G_C$; and (F) producing a corrected energy flow output signal ($E_C$) as a function of (E) and $C_E$.

16. The method of claim 15 wherein the gauge correction factor is determined according to a relationship selected from:

$$C_G = (k_e/k_{co})^{n1}(c_{pe}/c_{pco})^{n2}(T_e/T_c)^{n3}$$

or $$1/C_G = \{(A_0 + k_e)/(A_0 + k_{co})\}^{n1}\{(B_0 + c_{pe})/(B_0 + c_{pco})\}^{n2}(T_e/T_c)^{n3}$$

or $$1/C_G = \{(A_0 + A_1k_e^{m1} + A_2k_e^{m2} + \ldots)/(A_0 + A_1k_{co}^{m1} + A_2k_{co}^{m2} + \ldots)\}^{n1}$$
$$\{(B_0 + B_1c_{pe}^{p1} + B_2c_{pe}^{p2} + \ldots)/(B_0 + B_1c_{pco}^{p1} + \ldots)\}^{n2}(T_e/T_c)^{n3}$$

and the energy correction factor ($C_E$) is determined according to a relationship selected from:

$$C_E = (k_e/k_{co})^{n4}(c_{pe}/c_{pco})^{n5}(T_e/T_c)^{n6}$$

or $$1/C_E = \{(C_0 + k_e)/(C_0 + k_{co})\}^{n4}\{(D_0 + c_{pe})/(D_0 + c_{pco})\}^{n5}(T_e/T_c)^{n6}$$

or $$1/C_E = \{(C_0 + C_1k_e^{q1} + C_2k_e^{q2} + \ldots)/(C_0 + C_1k_{co}^{q1} + C_2k_{co}^{q2} + \ldots)\}^{n4}$$
$$\{(D_0 + D_1c_{pe}^{r1} + \ldots)/(D_0 + D_1c_{pco}^{r1} + \ldots)\}^{n5}\{T_e/T_c\}^{n6}$$

Where:
$n_1$ through $n_6$, $A_i$, $B_i$, $m_i$, $C_i$, $D_i$, $q_i$ and $r_i$ = constants determined by the calibration process, and
$k_{co}$, $c_{pco}$ and $T_c$ = thermal conductivity, specific heat and temperature of the calibration gas.

17. The method of claim 15 wherein $c_{pe}$, $k_e$ and $T_e$ are determined by a second microbridge in relatively static communication with said fluid of interest.

18. The method of claim 16 wherein $c_{pe}$, $k_e$ and $T_e$ are determined by a second microbridge in relatively static communication with said fluid of interest.

19. The method of claim 16 wherein said $C_G$ determined in step (C) is determined according to a known relationship among variables selected from the group consisting of specific heat ($c_{pe}$), the differential of specific heat with respect to temperature ($dc_{pe}/dT$), thermal conductivity ($k_e$), the differential of thermal conductivity with respect to temperature ($dk_e/dT$), density, viscosity, speed of sound, optical absorption or diffusibility.

20. The method of claim 16 wherein said step (C) of determining $C_G$ is omitted and $C_G$ is set equal to unity.

* * * * *